UNITED STATES PATENT OFFICE.

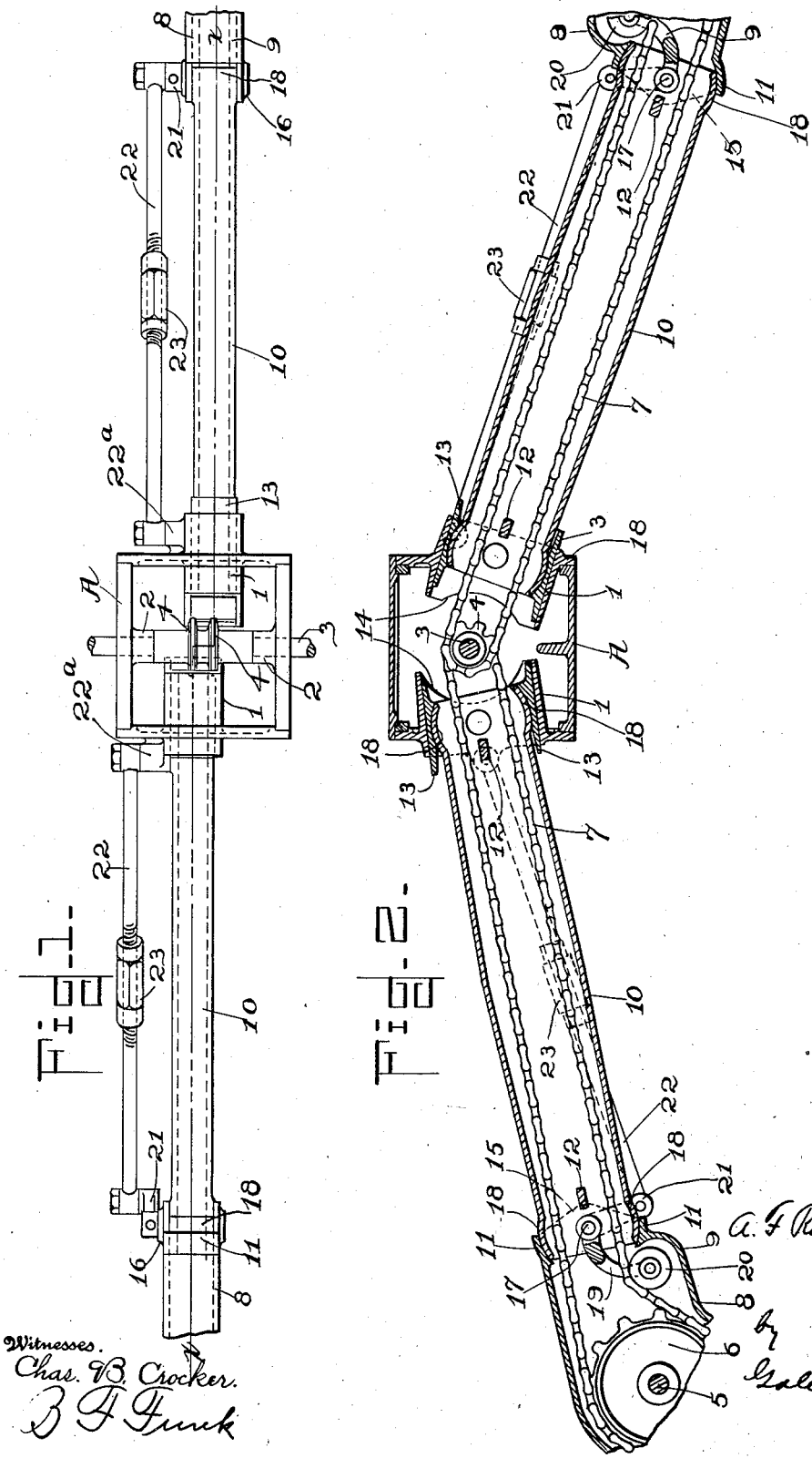

ALBERT F. ROCKWELL, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

GEARING.

No. 889,152.     Specification of Letters Patent.     Patented May 26, 1908.

Application filed October 9, 1905. Serial No. 281,960.

*To all whom it may concern:*

Be it known that I, ALBERT F. ROCKWELL, a citizen of the United States, residing at Bristol, county of Hartford, State of Connecticut, have invented a certain new and useful Gearing, of which the following is a full, clear, and exact description, such as will enable others skilled in the art to which it appertains to make and use the same, reference being had to the accompanying drawings, forming part of this specification.

This invention relates to the general class of gearing and particularly to a gearing in which a driving element and a driven element are employed, with means connecting them whereby power is communicated from one to the other.

One of the objects of my invention is to provide means whereby the connecting means, here shown as a band will be held taut irrespective of any relative movement of one of the elements with respect to the other.

Another object of the invention is to provide means whereby the gearing will be protected from dust, dirt and from the elements, so as to avoid any deterioration on account of foreign substances coming into contact with the driven element, the driving element or the complementary parts of the gearing.

A further object is to provide means whereby one of the elements may have a movement relative to the other in such a manner that the slack in the band or chain which connects said elements may be taken up automatically and controlled by the movable element.

A further object is to provide a flexible gearing which will permit the variation in the relative position of the two elements and at the same time efficiently protect the band and elements heretofore mentioned in the manner of a gear case.

By accomplishing the above objects I aim to overcome the annoyance and inconvenience resulting from the adherence of gritty substances, such as sand, which sometimes adhere to the lubricated band or chain, or to the teeth of the gears, and which frequently results in permitting a grinding action of the sand and grit on the chain with its obvious disadvantages.

I also contemplate overcoming the disadvantages resulting from the variation in the position of one of the elements with relation to the other, which has been experienced heretofore. For example, it has generally been the practice to accommodate the strain, jars and movements of the driving element with relation to the driven element by pivotally connecting the driven element and its motor base by means of distance rods. The object of such arrangement was to retain the motor base and driven element a certain predetermined distance apart during any relative movement of the driving element, and on account of the absence of lateral movement of the engine considerable strain was imposed through the distance rods upon the driven element so as to bend or spring the latter, so as to soon cause a prominent set or boul to be presented in the driven element. By the use of a construction worked out in accordance with my invention these objections are overcome, and any strains on the driven element, or even upon the driving element, other than those to which they would be subjected in communicating motion from one to the other, would be reduced to a minimum, if not wholly eliminated.

In the drawings: Figure 1 is a top plan view of a device constructed in accordance with my invention; and Fig. 2 is a vertical, longitudinal, sectional view through the same.

In order to convey a proper idea of the novel arrangement of my invention, I have illustrated it as being applicable for a motor vehicle gearing, and in such a manner that both the front and rear axles are driven from a single drive shaft. It is obvious, however, that the same generic principle would be involved whether one or a plurality of driven elements received motion from the driving element.

Referring now to the drawings, A designates a frame or guard section which may be secured to any suitable movable support, which we will suppose to be the body of a motor vehicle. The frame is provided with inclined ways or guides 1, which are arranged in the side walls of the frame, said guides receiving the parts of the flexible gear casing or dust guard to be referred to hereinafter.

Mounted in fixed bearings 2, in the frame A, is a drive shaft 3, which drive shaft may receive motion from a suitable motor, not shown. On the drive shaft 3, are a suitable number of sprockets 4. In the present instance I have shown two sprockets because I have illustrated a double drive gearing, but in the event that a single drive gearing would be used, it is obvious that one sprocket on the driving element or shaft 3 would be employed.

5 designates a driven element which may consist of a shaft or axle and which will preferably carry a sprocket 6 rotatable therewith and around which a band or chain 7 may pass, said chain also passing around one of the sprockets 4 on the drive shaft 3.

Inasmuch as I have illustrated the device as being applicable for a double drive, and in view of the fact that the mechanism on one side of the shaft 3 is substantially the same as that on the opposite side, the description and numerals applicable to the mechanism on one side will be equally applicable to the mechanism on the opposite side, and I shall, therefore, describe only one set of mechanism coöperating with the frame A and the driving element 3. The guard section 8 of the gear case or dust guard is of proper conformation to incase the rigid driven element 5 and its sprocket 6. The member 8 is provided with an enlargement 9, intermediate its ends, and terminates toward the frame A in a flared portion or socket 11 to receive the enlarged extremity 18 of the connecting member or intermediate guard section 10, which connects the members A and 8. This member 10 is in the form of a box girder, the side webs being of greater distance intermediate their ends than at their extremities, so as to provide a maximum strength to said member 10, for obvious reasons. The said webs may be additionally strengthened by the struts 12, which connect the opposite webs in each connecting member. The end of the connecting member 10, distant from the member 8, is provided with an enlargement or head 18', corresponding to the enlargement 18 fitting in the flared portion or socket 11. The head 18' engages a recess or socket in a sliding shoe 13, which is movable in the inclined guide 1. By this arrangement the shaft and its appurtenances, the chain or band, and the driven member 5 and its appurtenances are all securely protected against contact of dust, dirt or of the elements, and these parts will be protected against rust and deterioration due to the atmospheric condition which might otherwise tend to affect them.

For the purpose of illustration it is to be assumed that the frame A is attached to a motor vehicle body, which motor vehicle body usually rests upon springs supported by the running gear. The driven member 5, which we will assume is an axle to the vehicle and rigid on the running gear, is to be driven by the driving member 3. It would follow, therefore, that as the body of the vehicle vibrated in a vertical direction above the running gear the slack in the band or chain would become greater when the body was nearest the running gear, and would have a tendency to become taut when the body moved away from the running gear. In view of the fact that inconvenience may be caused by such successive and intermittent tightening and slackening of the chain, I have found it advisable to provide some means for automatically taking up the slack in the chain and letting it out as occasion may demand. A simple form of accomplishing this is illustrated in the drawing, consisting of a shaft 17 which may pass through the webs of the adjacent sections 8 and 10 of the gear case and thus form a pivotal connector between them, and on which is mounted a curved crank arm 19, carrying an idler pulley 20, said curved arm and idler being within the gear case.

On the outside of the gear case is a crank arm 21, placed at an angle different to the angle of inclination of the crank arm 19. The end of this crank arm 21 is connected to a pitman or rod 22, which in turn is pivotally secured to one end of a stub shaft $22^a$, carried by the frame or guard section A. This pitman or rod 22 may be made of two sections with an intermediately arranged turn buckle 23 connecting them, so that the proper adjustment may be made to initially position the idler-carrying arm for taking up the slack.

As the frame and driving element are in planes higher than the plane of the driven element it will follow that as the axis of the driving element and the frame move toward a parallel plane through the axis of the driven element, the distance between the axes of the driven and driving elements will become less; therefore, the chain or band will have more or less slack which it is desirable to take up. This will be automatically attended to by the mechanism which I have designated as a slack adjuster, and which, in the illustrated embodiment of my invention, includes the rod 22, the shaft 17, the arms 21 and 19 and the idler 20. When the distance between the driving element and the driven element becomes lessened, the rod 22 will have a longitudinal movement imparted thereto in the direction of the driven element causing the idler 20 to be raised or lowered according to whether the chain is in rear or in front of the frame A, but in either event the movement imparted to the idler will take up the slack in the chain so as to keep it relatively taut and prevent its becoming displaced from the sprockets 4 or 6. As soon as the frame A moves back to its former position or to a position distant from the running gear so that the distance between the driving element 3 and the driven element 5 is increased, a greater length of chain or band will be required and, therefore, the rod 22 will receive a longitudinal movement, this time away from the driven element so as to impart a movement to the idler 20 necessary to relieve the slack and compensate for the difference of distance between the two elements. This intermittent taking up and letting out of the slack will occur during each movement of the body with relation to the running gear, so that any unnecessary slack in the chain or band will not be present.

It is to be understood, of course, that in the above description the illustration of the devices as being applicable to motor vehicles is merely for the purpose of conveying a proper idea of the operation of the device, as it is obvious that it may be applied in other capacities without materially altering its construction or departing from the generic principles involved. For example, the driven element 5 might be arranged vertically, and the frame A might have a horizontal instead of a vertical movement. Attention is also called to the perfectly novel adjustment of the dust guard or gear case, which permits the relative movements of the driven and driving elements without affecting the efficiency of the gear case, and this is best accomplished by providing the sliding shoe in the guides 1, in which the connecting element 10 is carried and connecting this element 10 to the member 8 of the gear case, so that practically a universal joint is provided at both ends of the member 10, permitting a variation in the movement of one of the members with relation to the other and at the same time wholly incasing all of the parts so as to protect them.

What I claim is:

1. The combination with a driving member and a driven member, one of these being movable with relation to the other, and a driving connection between said members, of a slack take-up support having independent movement imparted thereto when one of the said members moves, and a slack take-up carried by said support and movable with respect thereto; substantially as described.

2. The combination with a driving member and a driven member, one of these being movable with relation to the other, and a driving connection between said members, of a slack take-up support having independent movement imparted thereto when one of the said members moves, a slack take-up carried by said support and movable with respect thereto, and an actuator for moving said take-up in proportion to the movement of the movable member, substantially as described.

3. The combination of a driving element, a driven element, one of said elements having motion toward and away from the other thereof, connecting means between said driving and driven elements for communicating motion from one to the other thereof, and a flexibly jointed guard member for said connecting means; substantially as described.

4. The combination with two shafts and means for communicating motion from one shaft to the other, one of said shafts having movement toward and away from the other, of a flexibly jointed gear case incasing the said means and the connected parts of said shafts; substantially as described.

5. The combination with two shafts, one of which is movable toward and away from the other, of a flexible gear case for incasing parts of said shafts, means for operably connecting said shafts, said means composing a band, and a slack take-up within the gear case for maintaining the band taut irrespective of the variation in space existing between the two shafts; substantially as described.

6. The combination with a driving element, a driven element, and a driving connector between said elements, one of said elements having movement toward and away from the other thereof, of a movable guard member, a movable slack take-up for said driving connector, and means whereby movement of said guard member causes operative movement of said slack take-up; substantially as described.

7. The combination with a driving element, a driven element, and a driving connector between said elements, one of said elements having movement toward and away from the other thereof, of a movable guard member for said driving connector, a movable slack take-up for said driving connector and carried by said guard member, and means for operating said take-up upon relative movement between said first two mentioned elements; substantially as described.

8. The combination with a driving element, a driven element, and a driving connector between said elements, one of said elements having movement toward and away from the other thereof, of a movable guard member for said driving connector, a movable slack take-up for said driving connector and carried by said guard member, and operative connection between said slack take-up and a part with relation to which said guard member is movable; substantially as described.

9. The combination of a driven shaft and a driving shaft therefor, one of said shafts having movement toward and away from the other, a band for communicating motion from the driving shaft to the driven shaft, a flexible gear case incasing a portion of the respective shafts and the band, and a slack take-up carried by the gear case and operable by the driving shaft to maintain the band taut irrespective of any movement of the driving shaft; substantially as described.

10. In a device of the class described, a driving shaft and a driven shaft, a movable support having bearings for one of the shafts, a band for communicating motion from one shaft to the other, a dust guard for the band and having one end slidable in the movable support, and a dust guard member for protecting the shaft at the opposite end of the band dust guard and having a recess into which the end of the band dust guard fits; substantially as described.

11. The combination with a driving element, a driven element, and a driving connector between said elements, one of said elements having movement toward and away from the other thereof, of a sectional guard member, a movable slack take-up for said driving connector and carried by one section of said guard member, and operative connection between said slack take-up and another section of said guard member with relation to which said other section said first mentioned section is movable; substantially as described.

12. The combination with a driving connector, of a sectional guard member, a pivotal element for adjacent sections of said guard member, and a slack take-up mounted upon said pivotal element; substantially as described.

13. The combination with a driving element, a driven element, and a driving connector between said elements, one of said elements having movement toward and away from the other thereof, of a guard section for one of said elements, a guard section for the other thereof, an intermediate guard section flexibly connected to one of said first mentioned two guard sections, a pivotal member between said intermediate guard section and the other of said first mentioned two guard sections, a movable slack take-up mounted upon said pivotal member, and operative connection between said slack take-up and said guard section to which said intermediate section is flexibly connected; substantially as described.

14. A movable dust guard comprising telescopic sections movable one within the other thereof; substantially as described.

15. In a dust guard, a section, a slide movable therein, and a second section rockable on said slide; substantially as described.

16. A dust guard comprising a member having a slide, a tubular member having one end engaging said slide, and a third member movably connected to the tubular member; substantially as described.

17. The combination of a driving element, driven elements upon opposite sides thereof, a driving connector between said driving element and each of said driven elements, there being relative movement between said driving element and said driven elements to vary the relative positions of said elements, and oppositely operating slack take-ups whose motion depends upon said relative movement, said take-ups coöperating with said driving connectors; substantially as described.

18. In a device of the class described, the combination with the front and rear axles of a vehicle, of a motor shaft above said axles and having movement in a vertical plane, chains connecting the motor shaft with the front and rear axles whereby motion will be communicated from the motor shaft to the said axles, and oppositely operating slack take-ups whose motion depends upon the motion of the motor shaft, so as to take up or let out slack in the chains as required on account of the movement of the motor shaft; substantially as described.

19. The combination of a driving element, a driven element, one of said elements being movable toward and away from the other thereof, a driving connector between said elements, a movable guard member for said driving connector, and a slack take-up for said driving connector and carried by said guard member; substantially as described.

20. In a device of the class described, the combination with a driving element and a driven element, one of these being movable with relation to the other, of means for communicating motion from one of said elements to the other, a gear case for incasing the means for communicating motion between the said two elements, and a slack take-up carried by the gear case for maintaining taut the said means for communicating motion irrespective of variation in space existing between the said two elements; substantially as described.

In testimony whereof, I hereunto affix my signature, in the presence of two witnesses.

ALBERT F. ROCKWELL.

Witnesses:
CHAS. R. RILEY,
JOSEPH D. BROWN.